Oct. 15, 1957 W. A. McGAHAN 2,809,854
SEALING DEVICE FOR ROTARY SHAFTS
Filed Oct. 25, 1954
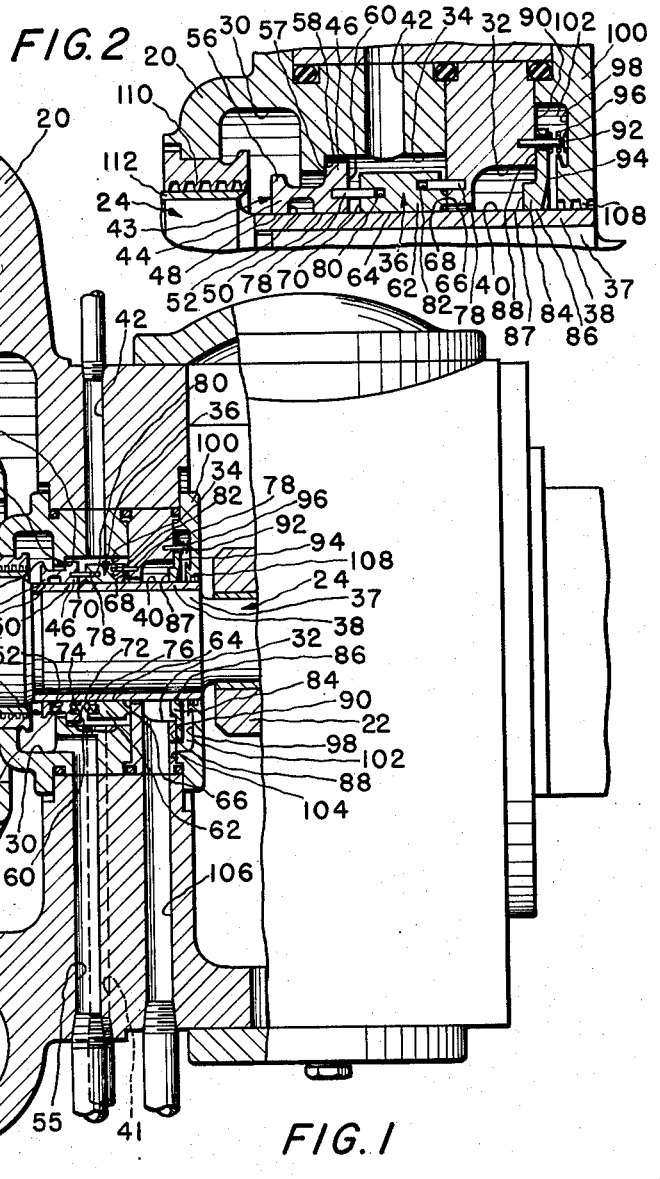
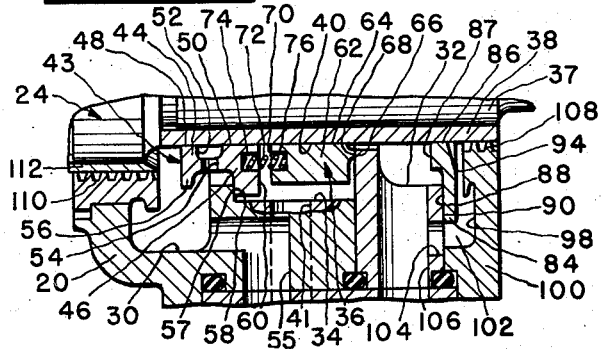
INVENTOR
WALLACE A. McGAHAN
BY
HIS ATTORNEY

2,809,854

SEALING DEVICE FOR ROTARY SHAFTS

Wallace A. McGahan, Phillipsburg, N. J., assignor to Ingersoll-Rand Company, New York, N. Y., a corporation of New Jersey Application October 25, 1954, Serial No. 464,355

6 Claims. (Cl. 286—7)

This invention relates to sealing devices, and more particularly to an improved rotary shaft seal for centrifugal pumps and the like.

It is common practice in the design of mechanical shaft seals, subjected to a pressure difference between the sealing liquid and the fluid being pumped, to employ slingers to remove from the shaft any sealing liquid leaking through the sealing parts prior to the collection and drainage of such liquid. Such slingers have the inherent disadvantage of separating the liquid into finely divided particles and even causing it to foam as it is thrown therefrom, making it difficult to catch and drain away and frequently resulting in leakage past the slingers.

The present invention, however, utilizes the principle of confinement, whereby a simplified construction prevents disintegration of the sealing liquid and effectively retains the leakage in suitable collection chambers to be completely drained away.

Accordingly, one object of the invention is to assure a leak-proof seal for a pump shaft.

Another object is to prevent disintegration of the sealing liquid to enable the fluid to be effectively confined and collected in the seal and readily drained therefrom.

A further object is the provision of an improved effective seal of simplified and compact construction requiring a minimum of maintenance.

Other objects will become apparent from the following description of the accompanying drawings which illustrate a preferred embodiment of the invention in which similar reference numerals refer to similar parts, and in which:

Fig. 1 is a side elevation, partly in section, of a portion of a centrifugal blower equipped with a sealing device constructed in accordance with the practice of the invention, Fig. 2 is an enlarged view of the upper portion of the side elevation, in section, of the sealing device, and Fig. 3 is an enlarged view of the lower portion of the side elevation, in section, of the sealing device.

Referring to the drawings, the invention is shown as applied to a centrifugal blower having a casing 20 on which is mounted a bearing 22 supporting a shaft 24 having an impeller 26 fixedly attached thereto. The impeller 26 is positioned in a pumping chamber 28 in the casing 20 containing gas under pressure. The shaft 24 extends through an inner collection chamber 30 in the casing adjacent the chamber 28 and containing gas of the same pressure as that existing in the chamber 28, through an outer collection chamber 32 in the casing subjected to atmospheric pressure and through a sealing chamber 34 lying between the collection chambers. Located in the sealing and collection chambers is a sealing device 36 which prevents leakage of the gas along the shaft to the atmosphere.

Referring in greater detail to the construction of the sealing device 36, the portion 37 of the shaft 24 lying in the collection and sealing chambers is of uniform diameter and carries a wearing sleeve 38 having a peripheral surface 40 of the same length as the portion 37.

Sealing oil of a higher pressure value than that in the chamber 30 is fed into the sealing chamber 34 through a passage 41 and is carried away through a passage 42 in the casing. Owing to the differential in the oil and gas pressures, some of the oil tends to flow toward the inner collection chamber 30.

In order to preclude excessive leakage of oil from the chamber 34 into the chamber 30, a non-rotatable sealing sleeve 43 encircling the shaft sleeve 38 and free to slide longitudinally thereof is provided at one end of the chamber 34 and includes inner and outer end portions, 44 and 46, positioned in the chambers 30 and 34, respectively. The end portions 44 and 46 have annular internal sealing surfaces 48 and 50, respectively, which fit the peripheral surface 40 with very small clearance to effect a seal. For example, a clearance of .002" on a side for a 4" diameter shaft is commonly used. This clearance is such that when the oil enters between the sleeve 38 and the sleeve 43, the sleeve 43 is forced laterally from the sleeve 38 to centralize itself about the shaft 24 and float on the existing oil film, thereby preventing rubbing contact and resulting wear on these parts. The outer end sealing portion 46, therefore, serves to retard the passage of oil therethrough and holds leakage at this point to a minimum.

Intermediate the end portions 44 and 46 encircling the sleeve 38 and thereby separating the inner and outer sealing surfaces 48 and 50, is an annular chamber 52 for intercepting the oil leaking past the sealing surface 50. A radially extending passage 54, connecting the chamber 52 with the inner collection chamber 30, is positioned at the bottom of the sleeve 43 and equalizes the oil pressure in the chambers 30 and 52 to drain the oil from the chamber 52 into the chamber 30, whence it is returned to a sump (not shown) through a passage 55. The sealing surface 48, therefore, acts as a seepage barrier to prevent any oil that may find its way into the chamber 52 from passing along the sleeve 38 toward the pumping chamber 28. Any slight amount of oil that may leak past the sealing surface 48 drains down the end face and drops off an annular ridge 56 on the end of the end portion 44 into the chamber 30.

The end portion 46, being of larger diameter than the end portion 44, has an annular shoulder 57 which seats against a matching surface 58 on the casing 20 to effect a seal for preventing the passage of oil between the sleeve 43 and the casing 20. The end surface of the end portion 46 opposite the shoulder 57 constitutes a pressure surface 60 for the application of the oil pressure in the sealing chamber 34 to actuate the sleeve 43 into sealing relation with the casing.

As will be readily appreciated, the pressure of the gas in the chamber 30 is greater than the atmospheric pressure in the chamber 32 and the pressure of the oil in the intermediate chamber 34 is greater than the gas pressure. Therefore, the oil has a greater tendency to flow toward the atmosphere and into the chamber 32. For this reason, a relatively wide non-rotatable sealing ring 62 is provided opposite the sleeve 43 at the other end of the chamber 34. The ring 62 encircles the sleeve 38 and is free to slide longitudinally thereof. The ring 62 has an annular internal sealing surface 64 closely fitting the peripheral surface 40 to form a seal and is caused to float on the sleeve 38 by the oil film therebetween. On the outer end of the ring 62 is an annular sealing surface 66 for cooperating with a matching sealing surface 68 on the casing to effect a seal and thereby prevent the passage of oil between the ring 62 and the casing. The inner end of the ring 62 constitutes a pressure surface 70 against which the oil acts to force the surface 66 into sealing engagement with the surface 68.

Augmenting the oil pressure against the surfaces 60 and 70 and serving to serving to seat the sealing sleeve 43 and the sealing ring 62 against the casing 20 are precompressed springs 72, the ends of which are seated at the bottom of blind holes 74 and 76 in the surfaces 60 and 70, respectively.

The sleeve 43 and the ring 62 are prevented from rotating with the shaft 24 by pins 78 which are embedded in the sleeve 43 and the casing 20 and slidable in holes 80 and 82 in the ring 62.

Most of the oil leaking through the sealing ring 62 is intercepted by the outer collection chamber 32 and returned to the sump through a drain passage 106. The rest of the oil is prevented from working along the sleeve 38 toward the atmosphere by a non-rotatable scraper disc 84 acting as a seepage barrier in the chamber 32 which encircles the sleeve 38 and is free to slide longitudinally thereof. The disc 84 is provided with an annular sealing surface 86 closely fitting the peripheral surface 40 to effect a seal and is also caused to float on the sleeve 38 by the oil film between the two. The inner end 87 of the disc 84 has an annular sealing surface 88 to seat against a matching sealing surface 90 on the casing 20.

The disc 84 is prevented from rotating with the shaft 24 by, and is slidable on, pins 92 embedded in the casing and extending through the disc. The pins 92 extend sufficiently beyond the outer end face 94 of the disc 84 to accommodate precompressed springs 96 thereon. The ends of the springs are seated on the face 94 and the inner end face 98 of a sealing plate 100, which encircles the shaft 24 between the disc 84 and the bearing 22 and may be fixedly secured to the casing 20 in any well known manner. The springs 96, therefore, constantly urge the disc 84 into sealing relation with the casing.

In the outer end of the casing 20 is a chamber 102 which constitutes a portion of the outer collection chamber 32 and for which the plate forms a cover. A passage 104 in the casing connects the chamber 102 with the drain passage 106. Since the chamber 32 and the chamber 102 are in communication, the air pressure therein is equalized and the oil leaking through the sealing ring shaft seal is retained in the chamber 32 by the disc 84, whence it drains off through the drain passage 106. Furthermore, the existence of uniform air pressure in the chambers 32 and 102 permits the springs 96 to maintain the sealing surfaces 88 and 90 in sealing engagement at all times. Thus the scraper disc also serves as a seepage barrier to prevent the oil from working along the sleeve 38 toward the bearing 22. Any small amount of oil passing through the disc drains down along the face 94 into the chamber 102 and is carried away by the passages 104 and 106.

In order to obviate the chance of oil leakage from the chamber 102 along the sleeve 38 past the plate 100, resulting from the effect of windage from the rotating shaft 24, the plate is provided with a labyrinth section 108 closely fitting the peripheral surface 40. Likewise, the portion of the casing 20 forming the chamber 30 contains a labyrinth section 110 which closely fits the peripheral surface of a sleeve 112 fixedly mounted on the shaft 24 adjacent the sleeve 38 to prevent the oil in the chamber 30 from passing into the pumping chamber 28.

During the normal operation of the blower, oil is introduced into the sealing chamber 34 through the passage 41 at a pressure slightly greater than the gas pressure in the pumping chamber 28. Although most of the oil flows out of the chamber 34 through the passage 42, the pressure differentials existing between the chamber 34 and the chambers 30 and 32, causes some of the oil to flow toward these last two chambers along the sleeve 38. The oil which leaks through the shaft seal of the end portion 46 and collects in the chamber 52 flows through the passage 54 into the chamber 30, whence it drains back to the sump through the passage 55. Any small amount of oil that may flow along the sealing surface 48 toward the chamber 30 will run down along the end of the sleeve 43 and drop into the chamber 30 and be drained away by the passage 55.

Any small particles or droplets of oil, which may be picked up and deposited on the peripheral surface of the sleeve 112 as a result of windage caused by the shaft 24, are prevented from passing into the chamber 28 by the labyrinth section 110 and will drop into the chamber 30.

It will be understood, that the oil pressure acting against the surface 60, together with the force of the springs 72, forces the sleeve 43 against the casing 20, thereby bringing the shoulder 57 into sealing engagement with the surface 58. Since the sleeve 43 floats on the oil film between itself and the sleeve 38, it may be caused under certain conditions of operation to move slightly relative to the casing 20, thereby permitting a small amount of oil to pass between the shoulder 57 and the surface 58 into the chamber 30.

Likewise, the pressure of the oil acting against the surface 70 augments the force of the springs 72 to force the ring 62 against the casing and also form a substantially stationary seal between the sealing surfaces 66 and 68. Therefore, some of the oil in the chamber 34 passes through the sealing ring shaft seal and works along the surface 40 into the chamber 32. Most of this oil is stopped by the disc 84 which causes it to run down the end 87 into the collection chamber 32 and be carried away by the passage 106. The small amount of oil passing through the scraper disc shaft seal adheres to and runs down the face 94 into the chamber 102, whence it flows through the passage 104 into the passage 106, owing to the equality of air pressure in the chambers 102 and 32. Moreover, any minute particles of oil picked up and deposited on the plate 100 are prevented from passing through the shaft seal thereof by the labyrinth section 108 and are forced to drain down the face 98 to the bottom of the chamber 102 and out through the passage 104.

It will be seen, therefore, that this seal construction including seepage barriers with close running clearances in conjunction with equal pressure on both sides thereof, serves to retain the oil in its liquid state and enables it to be effectively confined and removed for recirculation. Consequently, a leak-proof and trouble-free shaft seal for the blower is assured.

I claim:

1. A sealing device for a fluid pump, comprising a casing, a sealing chamber in the casing subjected to liquid under pressure greater than the pumped fluid pressure, a rotary shaft extending through the chamber, a non-rotatable sleeve in the sealing chamber encircling the shaft and movable longitudinally thereof and having a sealing surface closely fitting the shaft to effect a seal therewith, means in the casing engaging the sleeve to prevent rotation thereof with the shaft, there being an interception chamber in the sleeve and surrounding the shaft on the side of the sealing surface opposite the sealing chamber to receive liquid leaking therefrom, a seepage barrier positioned on the sleeve encircling the shaft and adjoining the interception chamber on the side opposite the sealing surface, said seepage barrier closely fitting the shaft to prevent flow of the liquid from the interception chamber along the shaft, a chamber surrounding the shaft on the side of the seepage barrier opposite the interception chamber, and means to equalize the liquid pressure in the last said chamber and the interception chamber.

2. The sealing device as claimed in claim 1 in which the non-rotatable sleeve is positioned at one end of the sealing chamber and said means includes a non-rotatable ring positioned at the other end of the sealing chamber encircling the shaft and movable longitudinally thereof and having a sealing surface closely fitting the shaft to form a seal therewith, a second interception chamber surrounding the shaft on the side of the ring sealing surface opposite the sealing chamber to receive liquid leaking therefrom, a non-rotatable second seepage barrier adjoining the second interception chamber on the side opposite the ring sealing surface and closely fitting the shaft to prevent flow of the liquid from the second interception chamber along the shaft, a second chamber surrounding the shaft on the side of the second seepage barrier opposite the second interception chamber, and means to equalize the liquid pressure in the said second chamber and the said second interception chamber.

3. In a sealing device for a fluid pump, the combination of a casing, a sealing chamber in the casing exposed to sealing liquid under pressure greater than the pumped fluid pressure, an inner collection chamber in the casing on one side of the sealing chamber and subjected to pumped fluid pressure, an outer collection chamber in the casing on the other side of the sealing chamber and subjected to atmospheric pressure, a rotary shaft extending through the chambers, a non-rotatable sleeve encircling the shaft and positioned to separate the sealing and inner collection chambers and being slidable longitudinally of the shaft, an interception chamber in the sleeve surrounding the shaft and in constant communication with the inner collection chamber to receive liquid leaking along the shaft from the sealing chamber, said sleeve having a sealing surface closely fitting the shaft to separate the interception and sealing chambers and having a seepage barrier encircling the shaft to separate the interception and inner collection chambers, said seepage barrier closely fitting the shaft to prevent flow of liquid therealong from the interception chamber into the inner collection chamber, a non-rotatable ring encircling the shaft and slidable longitudinally thereof for separating the sealing and outer collection chambers, said ring having a sealing surface closely fitting the shaft to form a seal therewith, means engaging the sleeve and the ring to the casing to prevent rotation of said sleeve and ring with the shaft, a non-rotatable disc in the outer collection chamber encircling the shaft and slidable longitudinally thereof and having a sealing surface closely fitting the shaft to act as a seepage barrier for preventing liquid leaking past the ring sealing surface from working along the shaft to the atmosphere, means in the casing engaging the disc to prevent rotation thereof with the shaft, and means connecting the portions of the outer collection chamber on opposite sides of the disc to equalize the atmospheric pressure in said chamber portions.

4. In a sealing device for a fluid pump having a casing, a sealing chamber in the casing subjected to sealing liquid under pressure greater than the pumped fluid pressure, a collection chamber in the casing adjacent the sealing chamber, a rotatable shaft extending through the chambers, a non-rotatable sleeve encircling the shaft and positioned to separate the sealing and collection chambers and slidable longitudinally of the shaft, said sleeve having a sealing surface thereon cooperating with the shaft to effect a seal therewith, an interception chamber in the sleeve surrounding the shaft and adjoining said sealing surface on the side opposite the sealing chamber to receive sealing liquid leaking therefrom, a passage in the sleeve connecting the interception chamber with the collection chamber to equalize the liquid pressure in said chambers, said sleeve having a second sealing surface adjoining the interception chamber on the side opposite the sealing surface and closely fitting the shaft to act as a seepage barrier for preventing flow of the liquid along the shaft from the interception chamber into the collection chamber, a shoulder on the sleeve adapted to seat against the casing, there being a pressure surface on the sleeve against which the liquid acts to move the shoulder into sealing relation with the casing, and pin means disposed in the sleeve and the casing and slidable in one of them to afford relative longitudinal movement therebetween and to prevent rotation of said sleeve with the shaft.

5. In a sealing device for a fluid pump having a casing, there being a sealing chamber in the casing subjected to sealing liquid under pressure greater than the pumped fluid pressure and a collection chamber in the casing adjacent the sealing chamber, a rotatable shaft extending through the chambers, a non-rotatable ring in the sealing chamber encircling the shaft and positioned to separate the sealing and collection chambers and slidable longitudinally of the shaft, said ring having a sealing surface cooperating with the shaft to effect a seal and a second sealing surface adapted to seat against the casing, there being a pressure surface on the ring opposite the second sealing surface and exposed to the liquid to move said second sealing surface into sealing relation with the casing, pin means disposed in the ring and the casing and slidable in one of them to afford relative longitudinal movement therebetween and to prevent rotation of said ring with the shaft, a non-rotatable scraper disc in the collection chamber encircling the shaft and slidable longitudinally thereof and having a sealing surface closely fitting the shaft to act as a seepage barrier for preventing the liquid leaking past the ring into the collection chamber from working along the shaft, a passage in the casing connecting the portions of the collection chamber on opposite sides of the disc to equalize the liquid pressure in said chamber portions, pin means disposed in the disc and the casing and slidable in one of them to afford relative longitudinal movement therebetween and to prevent rotation of the disc with the shaft, said scraper disc having a second sealing surface adapted to seat against the casing, and spring means constantly urging said second sealing surface of the disc into sealing relation with the casing.

6. In a sealing device for a fluid pump having a casing, the combination of a sealing chamber in the casing exposed to sealing liquid under pressure greater than the pumped fluid pressure, an inner collection chamber in the casing on one side of the sealing chamber and exposed to pumped fluid pressure, an outer collection chamber in the casing on the opposite side of the sealing chamber and exposed to atmospheric pressure, a rotary shaft extending through the chambers, a non-rotatable sleeve encircling the shaft and positioned to separate the sealing and inner collection chambers and slidable longitudinally of the shaft, said sleeve having a sealing surface closely fitting the shaft to effect a seal therewith, an annular interception chamber in the sleeve adjoining the sealing surface on the side opposite the sealing chamber to receive liquid leaking past the sealing surface, a passage in the sleeve connecting the interception chamber with the inner collection chamber to equalize the pumped fluid pressure in said chambers, said sleeve having a seepage barrier encircling the shaft and adjoining the interception chamber on the side opposite the sealing surface and closely fitting the shaft to prevent flow of the liquid along the shaft from the interception chamber into the inner collection chamber, a shoulder on the sleeve adapted to seat against the casing, there being a pressure surface on the sleeve opposite the shoulder and exposed to the liquid to move said sleeve longitudinally of the shaft into sealing relation with the casing, a non-rotatable ring encircling the shaft and positioned to separate the sealing and outer collection chambers and being slidable longitudinally of the shaft, said ring having a sealing surface closely fitting the shaft to form a seal therewith, there being a second sealing surface on the ring adapted to seat against the casing and a pressure surface on the ring opposite the second sealing surface and exposed to the liquid to move said ring longitudinally of the shaft into sealing relation with the casing, a spring interposed between the ring and the sleeve and constantly urging said ring and sleeve into sealing engagement with the casing, pin means disposed in the ring and the sleeve and the casing and slidable in at least one of them to afford longitudinal movement of said ring and sleeve relative to the casing while preventing rotation of said ring and sleeve with the shaft, a non-rotatable scraper disc in the outer collection chamber encircling the shaft and being slidable longitudinally thereof, said disc having a seepage barrier closely fitting the shaft to prevent the liquid leaking past the ring from flowing along the shaft toward the atmosphere, a passage in the casing connecting the portions of the outer collection chamber on opposite sides of the disc to equalize the atmospheric pressure in said chamber portions, said scraper disc having a sealing surface adapted to seat against the casing, pin means disposed in the disc and the casing and slidable in one of them to afford relative longitudinal movement therebetween while preventing rotation of said disc with the shaft, and a spring bearing against the scraper disc to constantly urge said disc into sealing engagement with the casing.

References Cited in the file of this patent

UNITED STATES PATENTS

| | | |
|---|---|---|
| 1,562,019 | Wilkinson | Nov. 17, 1925 |
| 1,846,598 | Hodgkinson | Feb. 23, 1932 |
| 1,910,811 | Peterson | May 23, 1933 |
| 2,015,233 | Pfleger | Sept. 24, 1935 |
| 2,049,774 | Hoffman | Aug. 4, 1936 |
| 2,246,912 | Baudry | June 24, 1941 |
| 2,592,082 | Trumpler | Apr. 8, 1952 |

FOREIGN PATENTS

| | | |
|---|---|---|
| 178,325 | Great Britain | Apr. 20, 1922 |
| 446,836 | Great Britain | May 7, 1936 |